US008434302B2

(12) United States Patent
Wu et al.

(10) Patent No.: US 8,434,302 B2

(45) Date of Patent: May 7, 2013

(54) HYDRAULIC SYSTEM INCLUDING OPEN LOOP AND CLOSED LOOP VALVE CONTROL SCHEMES

(75) Inventors: Duqiang Wu, Eden Prairie, MN (US); G. Clark Fortune, Farmington Hills, MI (US); Aaron H. Jagoda, St. Louis Park, MN (US); John Ryan Kess, Bloomington, MN (US); Thomas J. Stoltz, Allen Park, MI (US); Paul Brenner, Chaska, MN (US); Benjamin Morris, Ann Arbor, MI (US)

(73) Assignee: Eaton Corporation, Cleveland, OH (US)

( * ) Notice: Subject to any disclaimer, the term of this patent is extended or adjusted under 35 U.S.C. 154(b) by 1059 days.

(21) Appl. No.: 12/422,911

(22) Filed: Apr. 13, 2009

(65) Prior Publication Data

US 2009/0255246 A1 Oct. 15, 2009

Related U.S. Application Data

(60) Provisional application No. 61/044,337, filed on Apr. 11, 2008.

(51) Int. Cl.
*F16D 31/02* (2006.01)

(52) U.S. Cl.
USPC .............................................. 60/463; 60/459

(58) Field of Classification Search .................... 60/459, 60/462, 463; 91/361, 363 R
See application file for complete search history.

(56) References Cited

U.S. PATENT DOCUMENTS

| | | | |
|---|---|---|---|
| 4,901,703 A | 2/1990 | Humphries | |
| 4,907,493 A * | 3/1990 | Bellanger et al. | 91/361 |
| 2001/0017033 A1 | 8/2001 | McKinley et al. | |
| 2002/0046743 A1 | 4/2002 | Moren | |
| 2003/0140909 A1 | 7/2003 | Criddle et al. | |
| 2004/0112346 A1 | 6/2004 | Ahlborn et al. | |
| 2004/0139734 A1 | 7/2004 | Schmeichel et al. | |
| 2005/0000496 A1 | 1/2005 | Norrick | |
| 2005/0061305 A1 | 3/2005 | Pietschner | |
| 2006/0027212 A1 | 2/2006 | Gardner et al. | |
| 2006/0196482 A1 | 9/2006 | Kakimoto et al. | |
| 2007/0071609 A1 | 3/2007 | Gardner | |

FOREIGN PATENT DOCUMENTS

| | | |
|---|---|---|
| DE | 1801137 | 4/1970 |
| DE | 8809973 U1 | 9/1988 |
| DE | 3834201 | 11/1989 |
| DE | 19709910 A1 | 9/1998 |

(Continued)

OTHER PUBLICATIONS

English Abstract for JP-04292516, Oct. 16, 1992.

(Continued)

*Primary Examiner* — Michael Leslie

(74) *Attorney, Agent, or Firm* — Rader, Fishman & Grauer PLLC

(57) ABSTRACT

An exemplary hydraulic system includes a digital valve operable to fluidly connect a hydraulic load to a pressure supply. A digital controller is operably connected to the digital valve. The digital controller stores a target value of a hydraulic system operating parameter and is configured to formulate a pulse width modulated control signal based on the target value. The digital controller transmits the control signal to the digital valve for controlling the operation of the valve.

18 Claims, 7 Drawing Sheets

FOREIGN PATENT DOCUMENTS

| | | | |
|---|---|---|---|
| EP | 0220886 | A2 | 5/1987 |
| FR | 2243355 | | 4/1975 |
| GB | 1283208 | A | 7/1972 |
| JP | 55043221 | A | 3/1980 |
| JP | 04292516 | A | 10/1992 |
| JP | 5106608 | | 4/1993 |
| JP | 8285121 | | 11/1996 |

OTHER PUBLICATIONS

English Abstract for JP-55043221, Mar. 27, 1980.
International Search Report from PCT/EP2007/053816 mailed Sep. 22, 2008. (6 pages).
Fronczak et al., "Comparison of Analytical and Experimental Investigations of a Hydraulic Multi-Circuit Sequential Apportioning System", SAE Technical Paper Series, Sep. 1990.
Beachley et al. "A High Efficiency Multi-Circuit Sequential Apportioning Hydraulic System", Mechanical Engineering Department, University of Wisconsin-Madison, p. 163-170, Jun. 1988.
PCT International Search Report dated Jul. 7, 2009.
English abstract provided for DE-3834201, Nov. 2, 1989.
English abstract provided for DE-1801137, Apr. 16, 1970.
English abstract provided for JP-5106608, Apr. 27, 1993.
English abstract provided for JP-8285121, Nov. 1, 1996.

* cited by examiner

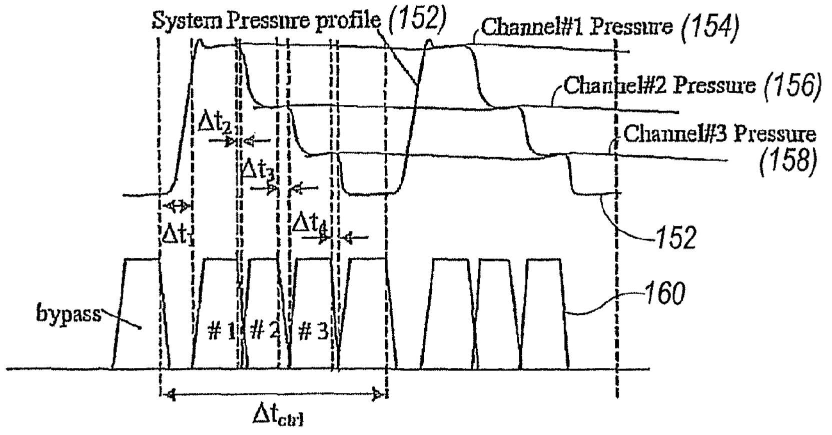
FIG. 5
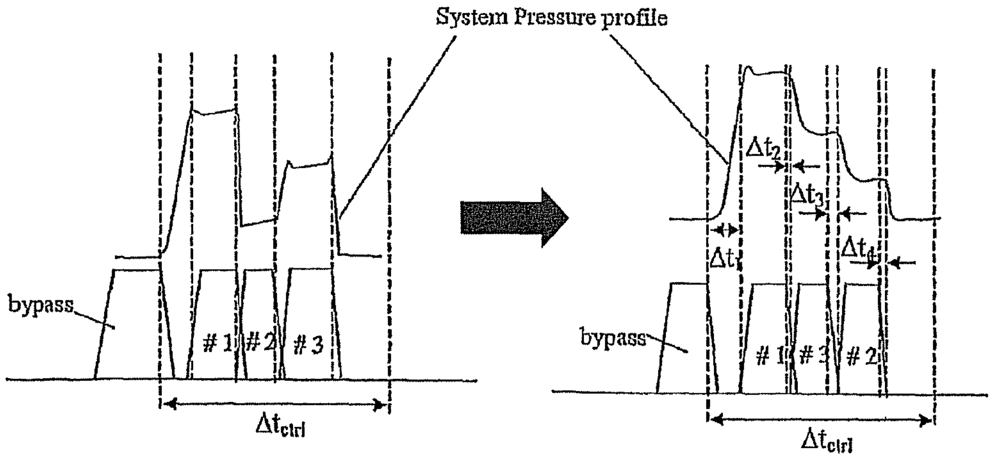
FIG. 6A
FIG. 6B

HYDRAULIC SYSTEM INCLUDING OPEN LOOP AND CLOSED LOOP VALVE CONTROL SCHEMES

CROSS REFERENCE TO RELATED APPLICATIONS

This application claims the benefit of U.S. Provisional Application 61/044,337 filed on Apr. 11, 2008 and PCT application PCT/US09/40219 filed on Apr. 10, 2009.

BACKGROUND

A hydraulic system may include multiple hydraulic loads, each of which may have different flow and pressure requirements that can vary over time. The hydraulic system may include a pump for supplying a flow of pressurized fluid to the hydraulic loads. The pump may have a variable or fixed displacement configuration. Fixed displacement pumps are generally smaller, lighter, and less expensive than variable displacement pumps. Generally speaking, fixed displacement pumps deliver a definite volume of fluid for each cycle of pump operation. But depending on the configuration of the pump and the precision with which the pump is manufactured, the flow output of the pump may actually decrease as the system pressure level increases due to internal leakage from the outlet side to the inlet side of the pump. The output volume of a fixed displacement pump can be controlled by adjusting the speed of the pump. Closing or otherwise restricting the outlet of a fixed displacement pump will cause a corresponding increase in the system pressure. To avoid over pressurizing the hydraulic system, fixed displacement pumps typically utilize a pressure regulator or an unloading valve to control the pressure level within the system during periods in which the pump output exceeds the flow requirements of the multiple hydraulic loads. The hydraulic system may further include various valves for controlling the distribution of the pressurized fluid to the multiple loads.

BRIEF DESCRIPTION OF THE DRAWINGS

FIG. 5 is a graphical depiction of an exemplary sequencing of the control valves employed with the hydraulic system.

FIGS. 6A and 6B are graphical depictions of changes to the valve sequencing order shown in FIG. 5 to accommodate changes in the pressure requirements of the hydraulic loads.

DETAILED DESCRIPTION

Figure 1:
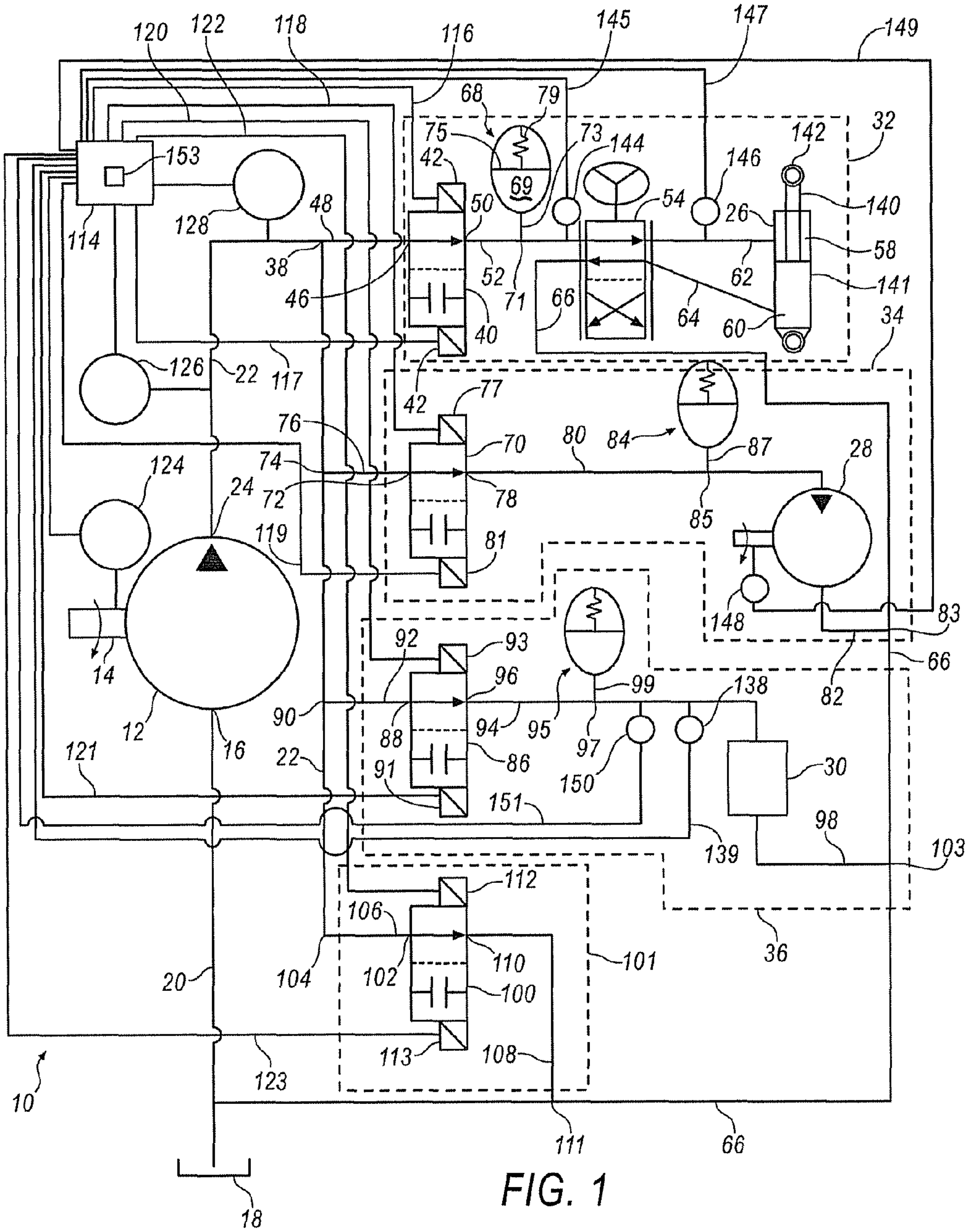
FIG. 1 is a schematic representation of an exemplary hydraulic system including a fixed displacement pump for driving multiple hydraulic loads.

Referring now to the discussion that follows and also to the drawings, illustrative approaches to the disclosed systems and methods are shown in detail. Although the drawings represent some possible approaches, the drawings are not necessarily to scale and certain features may be exaggerated, removed, or partially sectioned to better illustrate and explain the present invention. Further, the descriptions set forth herein are not intended to be exhaustive or otherwise limit or restrict the claims to the precise forms and configurations shown in the drawings and disclosed in the following detailed description.

FIG. 1 schematically illustrates an exemplary hydraulic system 10 for controlling multiple fluid circuits incorporating multiple hydraulic loads having variable flow and pressure requirements. Pressurized fluid for driving the hydraulic loads is provided by a hydraulic fixed displacement pump 12. Pump 12 may include any of a variety of known fixed displacement pumps, including but not limited to, gear pumps, vane pumps, axial piston pumps, and radial piston pumps. Pump 12 includes a drive shaft 14 for driving the pump. Drive shaft 14 can be connected to an external power source, such as an engine, electric motor, or another power source capable of outputting a rotational torque. An inlet port 16 of pump 12 is fluidly connected to a fluid reservoir 18 through a pump inlet passage 20. A pump discharge passage 22 is fluidly connected to a pump discharge port 24. Although a single pump 12 is illustrated for purposes of exemplary illustration, hydraulic system 10 may include multiple pumps, each having their respective discharge ports fluidly connected to a common fluid node from which the individual fluid circuits can be supplied with pressurized fluid. The multiple pumps may be fluidly connected, for example, in parallel to achieve higher flow rates, or in series, such as when higher pressures for a given flow rate are desired.

Pump 12 is capable of generating a flow of pressurized fluid that can be used to selectively drive multiple hydraulic loads. For purposes of illustration, hydraulic system 10 is shown to include three separate hydraulic loads, although it shall be appreciated that fewer or more hydraulic loads may also be provided depending on the requirements of the particular application. By way of example, the three hydraulic loads may include a hydraulic cylinder 26, a hydraulic motor 28, and a miscellaneous hydraulic load 30, which may include any of a variety of hydraulically actuated devices. Of course, it shall be appreciated that other types of hydraulic loads may also be used in place of, or in combination with, one or more of the illustrative hydraulic loads 26, 28 and 30, depending on the requirements of the particular application.

Each hydraulic load 26, 28, and 30 may be associated with a separate fluid circuit. A first fluid circuit 32 includes hydraulic cylinder 26; a second fluid circuit 34 includes hydraulic motor 28; and a third fluid circuit 36 includes miscellaneous hydraulic load 30. In the exemplary illustration the three fluid circuits are fluidly connected in parallel to pump discharge passage 22 at fluid junction 38.

Each fluid circuit includes a control valve, illustrated as a digital control valve, for individually controlling the operation of the hydraulic load associated with the respective fluid circuit. The control valve may control a time averaged flow rate passing through each of the respective fluid circuits and the corresponding pressure levels. Each control valve may include an actuator, which when activated opens the respective control valve to allow pressurized fluid to pass through the control valve to the associated hydraulic load. When utilizing a time averaged flow rate approach, the rate at which fluid passes through the control valve is controlled by repetitively cycling the control valve (i.e., opening and closing the valve) using a method commonly known as pulse width modulation ("PWM"). The control valve is either fully open or fully closed at any given time when employing pulse width modulation. The time averaged flow rate through the control valve, and corresponding pressure levels, may be controlled by adjusting the time periods during which the control valve is open and closed, also known as the valve duty cycle. For example, a duty cycle in which the valve is open generally fifty (50) percent of the time will generally produce a time averaged flow rate of approximately fifty (50) percent of the control pump's instantaneous flow output. Inherent fluctuations in the control valve's flow output tend to decrease as the operating frequency of the control valve increases. The inherent fluctuations in the control valve's flow may cause a pressure ripple that may be distributed to the load. The accumulator is generally sized such that the pressure ripples are acceptably small for a given application. Increasing the accumulator size may adversely affect the time required to respond to changes in load pressure. The operating frequency of the duty cycle may be increased, which may reduce the required accumulator size while improving both the response time and the magnitude of the pressure ripple. If the frequency is increased high enough, it may be possible to eliminate the accumulator by taking advantage of the natural compliance of the oil and conveyance to meet the pressure ripple requirement for the load. Valve operating speed limits and increased valve power losses that reduce efficiency may limit the operating frequency of the duty cycle.

Continuing to refer to FIG. 1, hydraulic system 10 includes a first control valve 40 for controlling the distribution of pressurized fluid from pump 12 to first fluid circuit 32, and in particular, to hydraulic cylinder 26. Control valve 40 may be a digital valve that can be operated in the manner described previously using pulse width modulation. Although illustrated schematically in FIG. 1 as a two-way, two-position valve, it shall be appreciated that other valve configurations may also be used depending on the particular application. Control valve 40 includes an inlet port 46 fluidly connected to pump discharge passage 22 at fluid junction 38 through an inlet passage 48. Fluidly connected to a discharge port 50 of control valve 40 is a discharge passage 52. First control valve 40 may also include an actuator 42 operable for selectively opening and closing a fluid path between inlet port 46 and discharge port 50 in response to a control signal. Actuator 42 may be configured to open control valve 40, but not close it, in which case a second actuator 43 may be employed to selectively close the valve. Actuators 42 and 43 may have any of a variety of configurations, including but not limited to, a pilot valve, a solenoid, and a biasing member, such as a spring.

The distribution of pressurized fluid to hydraulic cylinder 26 from control valve 40 may be further controlled by a hydraulic cylinder control valve 54, which is fluidly connected to control valve 40 through discharge passage 52. Hydraulic cylinder control valve 54 operates to selectively distribute the pressurized fluid received from control valve 40 between a first chamber 58 and a second chamber 60 of hydraulic cylinder 26. A first supply passage 62 fluidly connects first chamber 58 to hydraulic cylinder control valve 54, and a second supply passage 64 fluidly connects second chamber 60 to hydraulic cylinder control valve 54. A reservoir return passage 66, which is fluidly connected to hydraulic cylinder control valve 54, is provided for returning fluid discharged from hydraulic cylinder 26 to fluid reservoir 18.

A digital valve controlled using pulse width modulation generally does not produce a continuous flow output, but rather produces a cyclic output in which a volume of fluid is discharged from the valve followed by a period in which no fluid discharge is produced. To help compensate for the cyclic output of the control valve and deliver a more uniform flow of pressurized fluid to the hydraulic load, an accumulator 68 may be provided. Accumulator 68 stores pressurized fluid discharged from control valve 40 during the discharge stage of the valve duty cycle. The stored pressurized fluid can be released during the period in which control valve 40 is closed to compensate for the cyclic discharge of control valve 40 and deliver a more constant flow of pressurized fluid to hydraulic load 26.

Accumulator 68 may have any of a variety of configurations. For example, one version of accumulator 68 may include a fluid reservoir 69 for receiving and storing pressurized fluid. Reservoir 69 can be fluidly connected to discharge passage 52 at a fluid junction 71 through a supply/discharge passage 73. Accumulator 68 may include a moveable diaphragm 75. The location of diaphragm 75 within accumulator 68 can be adjusted to selectively vary the volume of reservoir 69. A biasing mechanism 79 urges diaphragm 75 in a direction that tends to minimize the volume of reservoir 69 (i.e., away from biasing mechanism 79). Biasing mechanism 79 exerts a biasing force that opposes the pressure force exerted by the pressurized fluid present within reservoir 69. If the two opposing forces are unbalanced, diaphragm 75 will be displaced to either increase or decrease the volume of reservoir 69, thereby restoring balance between the two opposing forces. For example, when control valve 40 is opened the pressure level at fluid junction 71 will tend to increase. Generally speaking, the pressure level within reservoir 69 corresponds to the pressure at fluid junction 71. If the pressure force within reservoir 69 exceeds the opposing force generated by biasing mechanism 79, diaphragm 75 will be displaced toward biasing mechanism 79, thereby increasing the volume of the reservoir and the amount of fluid that can be stored in reservoir 69. As reservoir 69 continues to fill with fluid, the opposing force generated by biasing mechanism 79 will also increase to the point at which the biasing force and the opposing pressure force exerted from within reservoir 69 are substantially equal. The volumetric capacity of reservoir 69 will remain substantially constant when the two opposing forces are at equilibrium. On the other hand, closing control valve 40 will generally cause the pressure level at fluid junction 71 to drop below the pressure level within reservoir 69. This coupled with the fact that the pressure forces across diaphragm 75 are now unbalanced will cause fluid stored in reservoir 69 to be discharged through supply/discharge passage 73 to discharge passage 52 and delivered to hydraulic load 26.

Hydraulic system 10 may also include a second control valve 70 for controlling the distribution of pressurized fluid from pump 12 to second fluid circuit 34, and in particular, to hydraulic motor 28. Control valve 70 may also be a high frequency digital valve that can be operated in the manner described previously using pulse width modulation. Although illustrated schematically in FIG. 1 as a two-way, two-position valve, it shall be appreciated that other valve configurations may also be used, depending on the requirement of the particular application. Control valve 70 includes an inlet port 72 fluidly connected to pump discharge passage 22 at a fluid junction 74 through a control valve inlet passage 76. Control valve 70 may also include an actuator 77 operable for selectively opening and closing a fluid path between inlet port 72 and a discharge port 78 in response to a control signal. Actuator 77 may be configured to open control valve 70, but not close it, in which case a second actuator 81 may be employed to selectively close the valve. Actuators 77 and 81 may have any of a variety of configurations, including but not limited to, a pilot valve, a solenoid, and a biasing member, such as a spring.

Fluidly connected to discharge port 78 of control valve 70 is a hydraulic motor supply passage 80 in fluid communication with hydraulic motor 28. In turn hydraulic fluid may be discharged from hydraulic motor 28 through a discharge passage 82 fluidly connected to reservoir return passage 66 at fluid junction 83. A second accumulator 84 may be provided within supply passage 80 to store pressurized fluid in much the same manner as previously described with respect to accumulator 68. Accumulator 84 can be fluidly connected to hydraulic motor supply passage 80 at a fluid junction 85 through a supply/discharge passage 87. Pressurized fluid discharged from control valve 70 can be used to charge accumulator 84 during the discharge stage of control valve 70. The stored pressurized fluid can be released during the period in which control valve 70 is closed to help minimize fluctuations in the flow of pressurized fluid being delivered to hydraulic load 28.

Hydraulic system 10 may also include a third control valve 86 for controlling the distribution of pressurized fluid from pump 12 to third fluid circuit 36. Similar to control valves 40 and 70, control valve 86 may also be a high frequency digital valve that can be operated in the manner described previously using pulse width modulation. Although illustrated schematically in FIG. 1 as a two-way, two-position valve, it shall be appreciated that other valve configurations may also be used, depending on the requirements of the particular application. An inlet port 88 of control valve 86 is fluidly connected to pump discharge passage 22 at a fluid junction 90 through a control valve inlet passage 92. Control valve 86 may also include an actuator 93 operable for selectively opening and closing a fluid path between inlet port 88 and a discharge port 96 in response to a control signal. Actuator 93 may be configured to open control valve 86, but not close it, in which case a second actuator 91 may be employed to selectively close the valve. Actuators 91 and 93 may have any of a variety of configurations, including but not limited to, a pilot valve, a solenoid, and a biasing member, such as a spring.

A hydraulic load supply passage 94 fluidly connects discharge port 96 of control valve 86 to hydraulic load 30. Pressurized hydraulic fluid may be discharged from hydraulic load 30 through a discharge passage 98 fluidly connected to reservoir return passage 66 at fluid junction 103. An accumulator 95 may be provided to store pressurized fluid in much the same manner as previously described with respect to accumulator 68. Accumulator 95 may be fluidly connected to hydraulic load supply passage 94 at a fluid junction 97 through a supply/discharge passage 99. Pressurized fluid discharged from control valve 86 may be used to charge accumulator 95 during the discharge stage of control valve 86. The stored pressurized fluid may be released when control valve 86 is closed to help offset fluctuations in the flow of pressurized fluid to hydraulic load 30.

Closing or otherwise restricting the outlet of fixed displacement pump 12 can cause the pressure within hydraulic system 10 to reach undesirable levels. To avoid over pressurizing the hydraulic system during periods in which the pump output exceeds the flow requirements of the hydraulic loads, a bypass control valve 100 associated with a bypass fluid circuit 101 may be provided. An inlet port 102 of bypass control valve 100 may be fluidly connected to pump discharge passage 22 at a fluid junction 104 through an inlet passage 106. Bypass control valve 100 is operable to selectively allow excess flow generated by pump 12 to be dumped to fluid reservoir 18. A bypass discharge passage 108 is fluidly connected to a discharge port 110 of bypass control valve 100 and reservoir return passage 66 at fluid junction 111. Bypass control valve 100 also includes an actuator 112 operable for selectively opening and closing a fluid path between inlet port 102 and discharge port 110 of bypass valve 100 in response to a control signal. Actuator 112 may be configured to open bypass control valve 100, but not close it, in which case a second actuator 113 may be employed to selectively close the valve. Actuators 112 and 113 may have any of a variety of configurations, including but not limited to, a pilot valve, a solenoid, and a biasing member, such as a spring.

A controller 114 may be provided for controlling the operation of control valves 40, 70, 86 and 100. More generally, controller 114 may form a portion of a more general system based Electronic Control Unit (ECU) or may be in operational communication with such an ECU. Controller 114 may include, for example, a microprocessor, a central processing unit (CPU), and a digital controller, among others.

More specifically controller 114 and any associated ECU is an example of a device generally capable of executing instructions stored on a computer-readable medium, such as instructions for performing one or more of the processes discussed herein. Computer-executable instructions may be compiled or interpreted from computer programs created using a variety of known programming languages and/or technologies, including, without limitation, and either alone or in combination, Java, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable medium (also referred to as a processor-readable medium) includes any tangible medium that participates in providing data (e.g., instructions) that may be read by a computer (e.g., by a processor of a computer, a microcontroller, etc.). Such a medium may take many forms, including, but not limited to, non-volatile media and volatile medial. Non-volatile media may include, for example, optical or magnetic disks, read-only memory (ROM), and other persistent memory. Volatile media may include, for example, dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other tangible medium with patterns of holes, a RAM, a PROM, an EPROM, a FLASH-EEPROM, any other memory chip or cartridge, or any other medium from which a computer can read.

A transmission media may facilitate the processing of instructions by carrying instructions from one component or device to another. For example, a transmission media may facilitate electronic communication between mobile device 110 and telecommunications server 126. Transmission media may include, for example, coaxial cables, copper wire and fiber optics, including the wires that comprise a system bus coupled to a processor of a computer. Transmission media may include or convey acoustic waves, light waves, and electromagnetic emissions, such as those generated during radio frequency (RF) and infrared (IR) data communications.

A digital controller 14 is illustrated. A first control link 116 operably connects controller 114 to actuator 42 of control valve 40. A second control link 117 operably connects controller 114 to actuator 43 of control valve 40. A third control link 118 operably connects controller 114 to actuator 77 of control valve 70. A fourth control link 119 operably connects controller 114 to actuator 81 of control valve 70. A fifth control link 120 operably connects controller 114 to actuator 93 of control valve 86. A sixth control link 121 operably connects controller 114 to actuator 91 of control valve 86. A first bypass control link 122 operably connects controller 114 to actuator 112 of bypass control valve 100. A second bypass control link 123 operably connects controller 114 to actuator 113 of bypass control valve 100. Controller 114 may be configured to control operation of the control valves in response to various system inputs, such as the pressure and flow requirements of the hydraulic loads, pump speed, pump exit pressure, and the discharge fluid flow rate from pump 12, among others. Depending on the requirements of the particular application, hydraulic system 10 may include various sensors for monitoring various operating characteristics of the system, and may include a speed sensor 124, a pressure sensor 126, and a flow sensor 128, as well as others.

Control valves 40, 70, 86, and 100 may be digitally controlled using pulse width modulation. Generally, the control valves are either fully open or fully closed when employing pulse with modulation. Also, typically only one control valve is fully open at any given instance, although a portion of the opening and closing sequences of consecutive valves may occur simultaneously, which is discussed in more detail subsequently. Substantially the entire quantity of fluid discharged from pump 12 passes through the control valve when the valve is open. Operating the control valve in this manner results in a generally cyclic fluid output, in which either the entire fluid output of pump 12 is discharged from the control valve or none at all. Control valves 40, 70, 86, and 100 are typically operated at a relatively high operating frequency. The operating frequency is defined as the number of duty cycles completed per unit of time, typically expressed as cycles/sec or Hertz.

The effective flow rate of fluid passing through control valves 40, 70, 86 and 100 can be controlled by adjusting the respective valve duty cycle. A complete duty cycle includes one opening and one closing of the control valve. The duty cycle can be expressed as the ratio of the time period that the control valve is open and the duty cycle operating period. The duty cycle operating period may be defined as the time required to complete one duty cycle. The duty cycle is typically expressed as a percentage of the operating period. For example, a seventy-five percent (75%) duty cycle results in the control valve being open approximately seventy-five percent (75%) of the time and closed twenty-five percent (25%) of the time. The term "effective flow rate" refers to the time averaged flow rate of fluid discharged from the control valve over one complete duty cycle expressed as a percentage of the flow output of pump 12. The effective flow rate is determined by dividing the total quantity of fluid discharged from the control valve over one complete duty cycle by the duty cycle operating period. For example, operating the control valve at a seventy-five percent (75%) duty cycle will produce an effective discharge flow rate of seventy-five percent (75%) of the flow output of pump 12.

Figure 2:
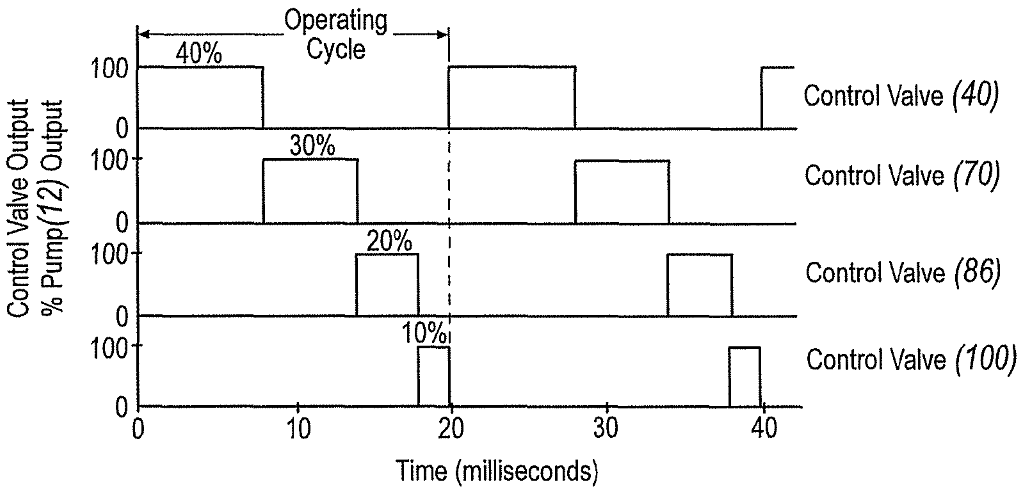
FIG. 2 is a graphical depiction of exemplary duty cycles employed by multiple control valves for controlling the distribution of pressurized fluid to the multiple hydraulic loads.

Exemplary duty cycles for control valves 40, 70, 86 and 100 are shown in FIG. 2. It shall be understood that the duty cycles shown in FIG. 2 are representative duty cycles selected for the purpose of discussing and illustrating various aspects of the hydraulic system. In practice, the duty cycle for a given control valve will likely vary from that which is illustrated, and indeed, any or all of the duty cycles may be continuously varied to accommodate changing operating requirements of the various hydraulic loads.

The duty cycles employed with each of the control valves 40, 70, 86, and 100, may be reevaluated for each operating cycle and adjusted as necessary to accommodated changing load conditions. Factors that may be considered in determining the appropriate duty cycles for control valves 40, 70, 86 and 100 may include the flow and pressure requirements of hydraulic loads 26, 28 and 30, the flow output of pump 12, the discharge pressure of pump 12, and the operating speed of pump 12, as well as others.

The duty cycle tracks a generally square waveform represented by a solid line in FIG. 2. The duty cycles for each of the control valves generally have the same operating period. For purposes of discussion, an operating period of 20 milliseconds is illustrated in FIG. 2. In practice, however, a longer or shorter operating period may be selected depending on the configuration of hydraulic system 10 and the requirements of the particular application in which the hydraulic system is used, provided that each of the control valves generally employs the same operating period. The operating period may be continuously varied to accommodate changing operating conditions.

The effective flow rate of control valves 40, 70, 86 and 100 may be controlled by varying their respective duty cycles. The duty cycle for each of the control valves 40, 70, 86 and 100 may be continuously varied to accommodate changing load conditions. Controller 114 may be configured to determine the duty cycle for each of the control valves. Controller 114 may also be configured to transmit a control signal corresponding to the desired duty cycle that may be used to control operation of the respective control valve. Controller 114 may include logic for determining an appropriate duty cycle based on a variety of inputs.

The control strategy employed by controller 114 may be based on an open-loop or closed-loop control scheme. In a closed-loop system, controller 114 may receive feedback information from a variety of sensors used to monitor various operating parameters, such as pressure, temperature, and speed, to name a few. Controller 114 may use the information received from the sensors to adjust, if necessary, the duty cycle of the respective control valve to achieve a desired load performance. A closed-loop system may allow various operating parameters, such as pressure, speed, and flow, to be controlled more precisely. A closed loop system may be used, for example, to control the pressure applied to hydraulic load 30. Controller 114 may receive feedback information from a pressure sensor 138 regarding the actual pressure applied to hydraulic load 30. A communication link 139 operably connects pressure sensor 138 to controller 114. Controller 114 may use the pressure data to compute a pressure error corresponding to the difference between the pressure commanded by controller 114 and the pressure applied to hydraulic load 30, as detected by pressure sensor 138. If the pressure error falls outside a selected error range controller 114 can modify the duty cycle of control valve 86 to achieve the desired pressure at hydraulic load 30.

A closed loop system may also be used to implement a load sensing control scheme. A hydraulic system employing load sensing has the ability to monitor the system pressures and to make appropriate adjustments as necessary to provide a desired flow rate at a pressure required to operate the hydraulic load. Load sensing may be implemented by monitoring a pressure drop across an orifice positioned within a passage supplying pressurized fluid to the hydraulic load. The pressure drop across the orifice is generally set at a predetermined fixed value. With the pressure drop across the orifice fixed, the flow rate through the orifice is only dependent on the flow area of the orifice. This enables the rate at which fluid is delivered to the hydraulic load to be controlled by adjusting the cross-sectional flow area of the orifice while maintaining the desired constant pressure drop. Increasing the orifice cross-sectional flow area increases the flow rate, whereas decreasing the orifice cross-sectional flow area decreases the flow rate. A change in the pressure drop across the orifice, which may be due for example, to an increase in the working load being moved by the hydraulic load, will cause a corresponding change in the flow rate of fluid delivered to the hydraulic load. The change in pressure drop across the orifice may be detected and compensated for by adjusting the upstream orifice pressure to achieve the desired pressure drop.

Load sensing capabilities may be advantageous when trying to control a hydraulic device requiring a particular flow while maintaining a particular pressure drop across a metering orifice. Hydraulic cylinder 26 is an example of such a device. Hydraulic cylinder 26 may be used in a variety of applications. By way of example and for purposes of discussion, hydraulic cylinder 26 will be described in the context of a power steering system, although it shall be appreciated that other applications of hydraulic cylinder 26 may also be possible. Hydraulic cylinder 26 may include a piston 140 slidably disposed in a cylinder housing 141. An end 142 of piston 140 is connected through a series of links to a wheel of the vehicle. Piston 140 may be slid longitudinally within cylinder housing 141 by selectively delivering pressurized fluid to first and second chambers 58 and 60. The rate at which the fluid is delivered to the respective chambers determines the speed at which piston 140 moves. Hydraulic cylinder control valve 54 operates to distribute the pressurized fluid between fluid chambers 58 and 60 of hydraulic cylinder 26. Hydraulic cylinder control valve 54 includes a variable orifice that controls the rate at which fluid is delivered to hydraulic cylinder 26. Hydraulic cylinder control valve 54 is responsive to a user input that causes the valve to adjust the orifice size to achieve a desired flow rate and to direct the flow to the appropriate chamber in hydraulic cylinder 26.

A load sensing control scheme may be implemented by arranging a pair of pressure sensors 144 and 146 upstream and downstream, respectively, of hydraulic cylinder control valve 54. A first communication link 145 and a second communication link 147 may operably connect pressure sensors 144 and 146, respectively, to controller 114. The pressure sensors may be configured to send a pressure signal to controller 114 indicative of the pressure at the respective sensor locations. Controller 114 uses the pressure data to formulate an appropriate control signal, using logic included in controller 114, for controlling the operation of control valve 40. The control signal includes a pulse width modulated signal that can be sent to actuator 42 across control link 116. Actuator 42 opens and closes control valve 40 in response to the received signal. Controller 114 determines an appropriate pulse width for the control signal that is calculated to deliver a desired flow at a desired pressure margin to hydraulic cylinder control valve 54. Controller 114 monitors the pressure drop across the orifice in hydraulic cylinder control valve 54 and may adjust the control signal as necessary to maintain the desired pressure drop across the orifice. For example, increasing the opposing force applied to end 142 of piston 140 may cause a corresponding increase in the downstream pressure monitored by pressure sensor 146 and a corresponding decrease in the pressure drop across the orifice in hydraulic cylinder control valve 54. The decreased pressure drop may also result in a corresponding decrease in the flow rate of fluid to hydraulic cylinder 26. To compensate for the decrease in flow, controller 114 may increase the pressure at the inlet to hydraulic cylinder control valve 54, which is monitored using pressure sensor 144, by adjusting the duty cycle of the control signal that controls the operation of control valve 40. The pressure to the inlet may be increased an amount sufficient to achieve the same pressure drop across the orifice that was present before the opposing force applied to end 142 of piston 140 was increased. In this way, the desired flow rate delivered to hydraulic cylinder 26, and thus the actuating speed of the piston, can be maintained at the desired level notwithstanding the fact the forces acting against the piston are continuously fluctuating.

A closed loop system may also be used to control the speed of a hydraulic device, such as hydraulic motor 28. Controller 114 may receive feedback information from a speed sensor 148 indicating the rotational speed of hydraulic motor 28. A communication link 149 operably connects speed sensor 148 to controller 114. Controller 114 may use the speed data to compute a speed error corresponding to the difference between a speed commanded by controller 114 and the actual rotational speed of hydraulic motor 28, as detected by speed sensor 148. If the speed error falls outside a selected error range, controller 114 may modify the duty cycle of control valve 70 in order to operate hydraulic motor 28 at the desired speed.

A closed loop system may also be used to control the flow rate of hydraulic fluid delivered to a hydraulic device, such as hydraulic device 30. Controller 114 may receive feedback information from a flow sensor 150 indicating the flow rate of fluid delivered to hydraulic device 30. A communication link 151 operably connects flow sensor 150 to controller 114. Controller 114 may use the flow data to compute a flow error corresponding to the difference between a flow rate commanded by controller 114 and an actual flow rate as detected by flow sensor 150. If the flow error falls outside a selected error range, controller 114 may modify the duty cycle of control valve 86 to achieve the desired flow rate.

Controller 114 may also include logic for controlling a maximum standby pressure. The maximum standby pressure represents the maximum pressure that can be applied to a hydraulic load. Digital high pressure standby control generally serves the same purpose as a high standby relief valve employed in an analog hydraulic system. A pressure relief valve may, however, be used in conjunction with a digital high pressure standby control as a backup measure. The maximum standby pressure setting is typically set lower than the pressure setting of a pressure relief valve, if one is used. This prevents the pressure relief valve from opening under normal operating conditions, which may result in an undesirable loss of energy. Once the pressure reaches the maximum allowable level, controller 114 may adjust the pulse width of the control signal used to control operation of the control valve associated with the hydraulic load to zero. Doing so closes the control valve to prevent any further increase in pressure.

Controller 114 may also include logic for controlling a low standby pressure. Low standby pressure control operates to help insure that a predetermined minimum pressure is always delivered to a hydraulic load when the load does not require any flow. Maintaining a minimum standby pressure may enable the hydraulic load to react in a predictable and reasonably responsive manner. The low standby pressure can be maintained by controller 114 generating a pulse width modulated control signal having narrow pulse width for controlling the control valve associated with the hydraulic load. The narrow pulse width control signal causes the valve to have an effective opening that is large enough to allow sufficient flow to pass through the control valve to compensate for system leakage while maintaining pressure at the minimum standby pressure level.

Low pressure standby control may be used, for example, in conjunction with a power steering system employing hydraulic cylinder 26. The low standby pressure typically occurs when the power steering system is positioned in the neutral position. With the power steering system in the neutral position, controller 114 may issue a low standby pressure command signal for instructing hydraulic cylinder control valve 54 to deliver the requested pressure to hydraulic cylinder 26. The low standby pressure is sufficient to allow the hydraulic cylinder 26 to firmly maintain the desired steering geometry of the vehicle and to enable quick actuation of the steering mechanism. In practice, controller 114 may formulate the pulse width modulated control signal for operating the control valve based on a maximum of the requested pressure level and the low standby pressure level, whichever is higher.

With continued reference to FIG. 2, control valve 40 is shown to employ an exemplary forty percent (40%) duty cycle; control valve 70 shown to employ an exemplary thirty percent (30%) duty cycle; control valve 86 shown to employ an exemplary twenty percent (20%) duty cycle; and control valve 100 shown to employ an exemplary ten-percent (10%) duty cycle. It shall be understood that the duty cycles depicted in FIG. 2 are for illustrative purposes only. In practice, the duty cycle for a given control valve may differ from that which is shown, and indeed, may vary with time to accommodate changing load requirements.

With continued reference to FIGS. 1 and 2, control valves 40, 70, 86, and 100 employ a common operating period, which for purpose of illustration, may be set at twenty (20) milliseconds. As noted previously, the actual operating period may vary depending on the configuration and operational requirements of hydraulic system 10. The control valves are actuated sequentially one after another in such a manner that when one valve is closed, or in some instance, nearly closed, the next valve is opened. Generally, only one valve is fully open at any given time, although there may be a relatively short period of time during which the opening and closing sequences of sequentially actuated valves intersect one another. Each valve is generally opened and closed only once during a given operating cycle. A single operating cycle comprises cycling through at least a subset of the available control valves only once. The sequence in which the valves are cycled may change between operating cycles.

When operating hydraulic system 10 there may be instances in which the flow requirements of the hydraulic loads exceeds the flow output of pump 12. When that occurs a determination may be made as to what proportions the available flow will be distributed between the hydraulic loads. This may be accomplished by assigning each hydraulic load a priority level. For example, a priority level one (1) may be considered the highest priority, a priority level two (2) the second highest priority, and so forth. Each hydraulic load may be assigned a priority level. The bypass circuit is typically assigned the lowest priority level.

Various criteria may be used to determine the priority assignments, including but not limited to safety concerns, efficiency considerations, operator convenience, among others. Each hydraulic load may be assigned a separate priority level or multiple hydraulic loads may be assigned the same priority level depending on the requirements of the particular application. The priority level assignment for each load may be saved in controller 114 such as by way of memory 153, or in the memory or other tangible storage mechanism of a system level electronic control unit (ECU) in operational communication with controller 114.

The available flow may be distributed to the hydraulic loads based on their priority level ranking, with the hydraulic loads assigned the highest priority level (i.e., priority level 1) receiving all of the flow they require, and the remaining hydraulic loads receiving either a reduced flow or no flow at all. An example of possible priority level assignments for fluid circuits 32, 34, 36 and 101, and a resulting flow distribution based on the priority level assignments is shown in Table 1 below. For purposes of this example, it is assumed that hydraulic pump 12 has a maximum output of one-hundred fifty (150) liters/min. For illustrative purposes, first fluid circuit 32, which includes hydraulic cylinder 26, is assigned a priority level one. Second and third fluid circuits 34 and 36 are assigned a priority level two. Bypass fluid circuit 101, which is typically assigned the lowest priority level, is assigned priority level three. In this example, the first fluid circuit requires two-thirds (66.7 percent) of the total available flow, or 100 liters/min. The second and third fluid circuits both require one-third (33.3 percent) of the available flow, or 50 liters/min. Since the total flow requirement of all three fluid circuits exceed the available flow from pump 12, the second and third fluid circuits, which are assigned a lower priority than the first fluid circuit, will receive only a portion of their required flow. The first fluid circuit will receive its total flow requirement of 100 liters/min. This leaves 50 liters/min. to be distributed between the second and third fluid circuits. Since the second and third fluid circuits have the same priority level, the remaining 50 liters/min. is divided evenly between the two fluid circuits, with each circuit receiving 25 liters/min. The bypass fluid circuit receives no fluid in this example since all of the available fluid is distributed between the other three fluid circuits.

TABLE 1

Total flow rate available = 150 liters/min.

| Fluid Circuit 1-3 and bypass | Priority Level 1-3 1 = highest 3 = lowest | Flow Required liters/min. | Flow Required Percent of total available | Commanded Flow Percent of total available | Actual Flow liters/min. |
|---|---|---|---|---|---|
| 1$^{st}$ fluid circ. (32) | 1 | 100 | 66.7 | 66.7 | 100 |
| 2$^{nd}$ fluid circ. (34) | 2 | 50 | 33.3 | 16.65 | 25 |
| 3$^{rd}$ fluid circ. | 2 | 50 | 33.3 | 16.65 | 25 |

TABLE 1-continued

| Fluid Circuit 1-3 and bypass | Priority Level 1-3 1 = highest 3 = lowest | Flow Required liters/min. | Flow Required Percent of total available | Commanded Flow Percent of total available | Actual Flow liters/min. |
|---|---|---|---|---|---|
| Total flow rate available = 150 liters/min. | | | | | |
| (36) | | | | | |
| Bypass fluid circ. (101) | 3 | n/a | Excess | 0 | 0 |

The order in which the control valves are actuated may have an effect on the efficiency of the hydraulic system. The valves may be actuated in sequential order based on various selected criteria, for example, in order of decreasing or ascending pressure. The order in which the control valves are actuated may be determined based on the pressure requirements of the hydraulic loads, for example, hydraulic loads 26, 28, and 30. Typically, the control valve supplying the hydraulic load with the highest pressure requirement is actuated first, followed by the control valve supplying the hydraulic load with the next highest pressure requirement and so forth down the line until all of the control valves have been actuated. If a particular hydraulic load does not require pressure, the control valve associated with the non-operational hydraulic load will not be opened during that particular operating cycle. Bypass control valve 100 is typically actuated last, if at all, after all of the remaining control valves (i.e., control valves 40, 70, and 86) have been actuated. Once all the control valves have been actuated the present operating cycle is completed and the next operating cycle may be commenced.

An example of a possible sequencing order for control valves 40, 70, 86, and 100 is illustrated graphically in FIG. 5. An upper curve 152 in the graph represents an exemplary system pressure profile, for example, as measured by pressure sensor 126 (see FIG. 1). Exemplary individual channel pressure curves 154, 156 and 158, represent a pressure occurring at the inlet to hydraulic loads 26, the respective hydraulic load. The "channel #1 pressure" curve 154 depicts the time varying pressure as measured at the inlet to hydraulic cylinder 26. The "channel #2 pressure" curve 156 depicts the time varying pressure as measured at the inlet to hydraulic motor 28. The "channel #3 pressure" curve 158 depicts the time varying pressure as measured at the inlet to miscellaneous hydraulic load 30. The generally square-wave curve 160 shown at the bottom of the figure graphically depicts an opening and closing sequence of control valves 40, 70, 86 and 100. The pulse labeled "#1" depicts an exemplary opening and closing of control valve 40. The pulse labeled "#2" depicts an exemplary opening and closing of control valve 70. The pulse labeled "#3" depicts an exemplary opening and closing of control valve 86. The pulse labeled "bypass" depicts an exemplary opening and closing of bypass control valve 100. Since hydraulic cylinder 26 has the highest pressure requirement in this example, control valve 40 will be actuated first, followed in order, by control valve 70 that controls the operation of hydraulic motor 28, and control valve 86 that controls the operation of miscellaneous hydraulic load 30. Bypass control valve 100 is actuated last. The same sequence may be repeated for subsequent operating cycles provide there is no change in the pressure requirements of the hydraulic loads that may require changing the sequencing order.

The order in which the control valves are sequenced may not always be consistent. The sequencing order may be varied between operating cycles, and in some cases midway through an operating cycle, to accommodate changes in operating conditions, such as load pressure requirements. If the pressure requirement of a hydraulic load becomes higher than the pressure requirement of one or more of the remaining hydraulic loads, the sequencing order may be reordered so that the control valves continue to be sequenced from the highest pressure requirement to the lowest pressure requirement. For example, in FIG. 5, hydraulic cylinder 26 is depicted as having the highest pressure requirement, followed in order by hydraulic motor 28 and miscellaneous hydraulic load 30. The control valves are accordingly sequenced in descending order, with control valve 40 being actuated first, followed in order by control valves 70 and 86. Bypass valve 100 is actuated last. If the pressure requirement of miscellaneous hydraulic load 30 were to become higher than the pressure requirement of hydraulic motor 28, for example, as shown in FIG. 6A, the sequencing order may be rearrange, such that control valve 86 is actuated before control valve 70. The revised sequencing order is illustrated in FIG. 6B. The sequencing order may be re-evaluated and adjusted if necessary at the beginning of each subsequent operating cycle. The operating period may also be varied between operating cycles.

Figure 8A:
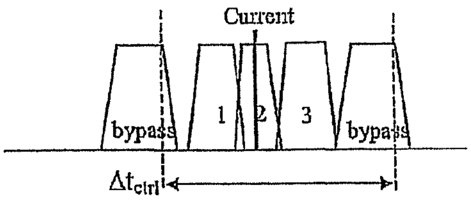
FIGS. 8A and 8B are graphical depictions of an exemplary implementation of progressive pulse width control.
Figure 8B:
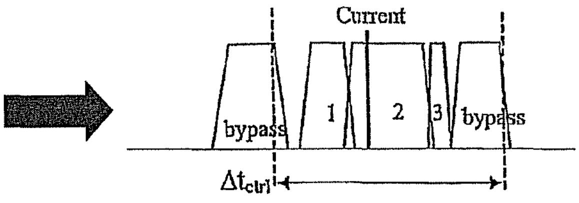

Improvements in overall system performance may be realized by adjusting the pulse width of a control valve midway through an operating cycle to accommodate changes in the flow requirements of the hydraulic load. This is in contrast to determining the pulse width for each hydraulic load at the start of an operating cycle and maintaining the same pulse width for the duration of the operating cycle. Progressive pulse width control, in which the pulse width is adjusted midway through the operating cycle, may improve system bandwidth, which is directly influenced by the system's operating cycle frequency. An exemplary implementation of progressive pulse width control is illustrated graphically in FIGS. 8A and 8B. FIG. 8A illustrates an operating cycle in which the pulse width for each hydraulic load and the bypass (designated "1", "2", "3" and "bypass" in FIG. 8A) is determined at the beginning of the operating cycle. In the example illustrated in FIG. 8A, the operating cycle has progressed to the time identified by the line marked "Current" in FIG. 8A. Control valve 2 (labelled "2" in FIG. 8A) is currently in the process of supplying flow to the corresponding hydraulic load. Assume that midway through its duty cycle there is in increase in the flow requirement of the hydraulic load associated with control valve 2. To accommodate the increased flow demand, the pulse width of the control signal used for controlling control valve 2 may be increased and the pulse width of the signal for controlling control valve 3 or the bypass valve may be reduced in proportion to the increase in the pulse width associated with control valve 2. The changes to the duty cycle to accommodate the increased flow requirements of the hydraulic load associated with control valve 2 are reflected in FIG. 8B. Since the flow requirements of the hydraulic load associated with control valve 1 have already been satisfied within the current operating cycle, any changes in its flow requirements will not be accommodated until the next operating cycle.

Referring again to FIG. 5, the timing during which one control valve is closed and the next control valve is opened may affect the efficiency of the hydraulic system. Effective control of the time delay between closing one valve and opening the next may help minimize energy losses that may occur while transitioning between fluid circuits, such as first fluid circuit 32, second fluid circuit 34, third fluid circuit 36, and bypass fluid circuit 101 (see FIG. 1). The time delay is identified as "Δt" in FIG. 5. The first time delay ($\Delta t_1$) represents the delay between commencing closing bypass valve 100 and commencing opening control valve 40. The second time delay ($\Delta t_2$) represents the delay between commencing closing control valve 40 and commencing opening control valve 70. The third time delay ($\Delta t_3$) represents the delay between commencing closing control valve 70 and commencing opening control valve 86. The forth time delay ($\Delta t_4$) represents the delay between commencing closing control valve 86 and commencing opening bypass valve 100.

Factors that may be considered in determining an appropriate time delay may include the volume and the compliance of the fluid supply circuit between pump 12 and control valves 40, 70, 86 and 100. The time delay is also a function of the pressure difference between fluid circuits.

Figure 7A:
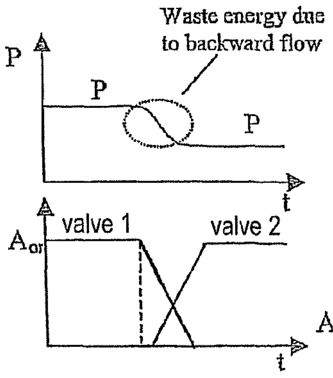
FIGS. 7A and 7B are graphical depictions of the effect of time delay on system pressure.
Figure 7B:
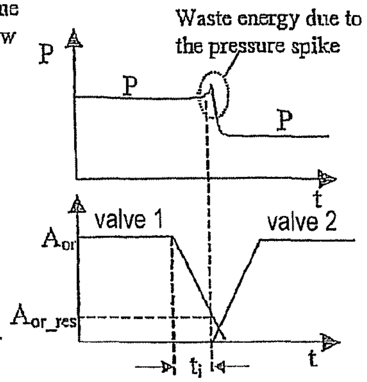

If the time delay between commencing closing one control valve and commencing opening the next successive control valve is too long, energy may be wasted as the fluid present in the supply circuit leading to the control valve is compressed, thereby causing a spike in system pressure. This phenomenon is depicted graphically in FIG. 7B. The upper graph in FIG. 7B depicts an exemplary change in system pressure (P) (for example, the pressure sensed by pressure sensor 126 in FIG. 1) as a first control valve closes and the next control valve opens. The lower graph in FIG. 7B graphically depicts an exemplary opening and closing two control valves. The valves are fully open at ($A_{or}$). The left portion of the lower curve graphically depicts the closing of a first valve and the right portion of the curve graphically depicts the opening of a second valve. Because the time delay is short, fluid present in the fluid supply circuit between the hydraulic pump and the control valve (i.e., pump discharge passage 22 in FIG. 1) is compressed causing a spike in pressure that can be observed in the upper pressure curve of FIG. 7B.

If the delay between commencing closing one valve and commencing opening the next successive valve is too short, fluid may flow backward from the previous hydraulic load (valve 1) to the next hydraulic load (valve 2). This phenomenon is depicted graphically in FIG. 7A. The upper curve in FIG. 7A depicts an exemplary change in system pressure (P) as a first control valve closes and the next control valve opens. The lower curve in FIG. 7A graphically represents an exemplary opening and closing of the control valves. The valves are fully open at ($A_{or}$). In this example, a second control valve begins to open before a first control valve has fully closed. Note that the system pressure depicted in the upper graph of FIG. 7A begins to drop as the first control valve begins to close. Although having a short time delay may not necessarily result in a drop in efficiency, unless for example the fluid backflows from a hydraulic load to a tank, such as fluid reservoir 18 (see FIG. 1), it nevertheless may be accounted for when determining a control signal pulse width that will provide the net flow required by the hydraulic load. Accordingly, it may also be desirable to optimize the time delay between commencing closing the bypass control valve and commencing opening the first control valve in the sequence and the time delay between commencing closing the last control valve in the sequence and commencing opening the bypass valve. Determining a proper time delay may entail a compromise between minimizing the amount of backflow occurring between the control valves, as depicted in FIG. 7A, and minimizing the occurrence of system pressure spikes, as depicted in FIG. 7B.

The time delay (Δt) may be determined using the following equation:

$$\Delta t=\alpha*\Delta P+\text{TimeDelayAdder}$$

Where:

Δt (Time Delay) is the time period between commencing to close one control valve and commencing to open the next subsequent valve (see for example FIG. 5);

α is a parameter that may be dependent on various parameters, for example, valve transition speed, valve friction, pump flow rate, thermal effects, effective bulk modulus of the hydraulic fluid, and the internal volume of the an internal pump or the valve manifold;

ΔP is the pressure difference between the hydraulic load and the outlet of the pump; and TimeDelayAdder is an empirically determined correction factor for optimizing the time delay.

By way of example, in instances where a is dependent on manifold volume, pump flow rate, and effective bulk modulus of the hydraulic fluid, the time delay (Δt) may be determined using the following equation:

$$\Delta t=\frac{\Delta PV}{\beta Q}+TimeDelayAdder$$

Where:

Δt (Time Delay) is the time period between commencing to close one control valve and commencing to open the next subsequent valve (see for example FIG. 5);

ΔP is the pressure difference between the hydraulic load and the outlet of the pump;

V is the fluid volume of the fluid circuit between the pump outlet and the inlet of the control valve;

β is the effective bulk modulus of the hydraulic system;

Q is the flow rate of the pump; and

TimeDelayAdder is an empirically determined correction factor for optimizing the time delay.

The bulk modulus may be determined using the following equation:

$$\beta=V\frac{\partial P}{\partial V}=V\frac{dP}{dt}\Big/\frac{dV}{dt}$$

The bulk modulus varies non-linearly with pressure. The bulk modulus of the hydraulic fluid is a function of temperature, entrained air, fluid composition and other physical parameters. The bulk modulus of the hydraulic system is representative of the volume and rigidity of the hydraulic system hardware and is a factor in determining an appropriate time delay. The effective bulk modulus of a hydraulic system is a compilation of the bulk modulus of the fluid and the bulk modulus of the system hardware. In practice, the bulk modulus may vary significantly, and if possible, may be measured to obtain an accurate bulk modulus for use in computing the time delay. Measurement of the effective bulk modulus may be accomplished, for example, by monitoring a pressure rise in hydraulic system 10 as a function of fluid flow from pump 12 with all the control valves 40, 70, 86 and 100, closed. The pump flow may be approximated using the following equation:

$$\text{Pump Flow}=(\text{Pump Revolutions Per Minute (RPM)})\times(\text{Pump Displacement per Pump Revolution})\times(\text{Approximate Volumetric Efficiency})$$

Pressure rise may be monitored using a pressure sensor (i.e., pressure sensor 126 in FIG. 1) located in the fluid supply circuit between pump 12 and control valves 40, 70, 86 and 100. A lookup table containing a map of the effective bulk modulus as a function of pressure may be generated and stored in memory 163 of controller 114 for use in computing the time delay.

The bulk modulus can be mapped during an initial start-up of the hydraulic system to provide an initial operating map. The bulk modulus can be measured periodically as the hydraulic fluid heats up until a steady state condition is reached. Bulk modulus maps for similar system conditions obtained during previous operating cycles may be compared and used to evaluate the status of the hydraulic system. For example, a substantial decrease in bulk modulus may indicate a significant increase in entrained air in the hydraulic fluid, or an impending failure in a hydraulic system hose or pipe.

The TimeDelayAdder parameter included in the equation for computing the time delay (Δt) is a correction factor for optimizing the time delay (Δt). The a parameter and the TimeDelayAdder parameter may be determined empirically. The a term of the time delay equation, which may correspond, for example, to the equation (ΔPV/βQ), or another functional relationship, provides an estimate of the amount of delay between commencing to close one control valve and commencing to open the next successive valve. Since it is only an estimate, however, the computed time delay (Δt) may not produce an optimum balance between minimizing system pressure spikes and backflow occurring between successively actuated control valves.

The effectiveness of the time delay (Δt) estimate may be assessed by computing a corresponding Time Delay Pressure Error that at least partially accounts for the losses associated with both spikes in system pressure and backflow from one control valve to the next. The Time Delay Pressure Error may be computed using the following equation:

$$\text{Time Delay Pressure Error}=\text{MAX}[(P_{pump}-(P_{load}-\Delta P_{valve}),0]+\text{ABS}(\text{MIN}[P_{pump}-P_{load},0])$$

Where:

$P_{pump}$ is a pressure output from pump 12, as detected, for example, using pressure sensor 126;

$P_{load}$ is a pressure delivered to the hydraulic load (i.e., hydraulic loads 26, 28 and 30); and $\Delta P_{valve}$ is a steady state pressure drop across the control valve (i.e., control valves 40, 70, 86 and 100).

The steady state pressure drop across the control valve ($\Delta P_{valve}$) may be obtained from a look-up table stored in memory 153 of controller 114, wherein the steady state pressure drop is correlated to the flow rate of pump 12. The flow rate of pump 12 may be computed using a measured pump RPM, which may be detected, for example, using speed sensor 124, and the previously described equation for determining Pump Flow.

Figure 9:
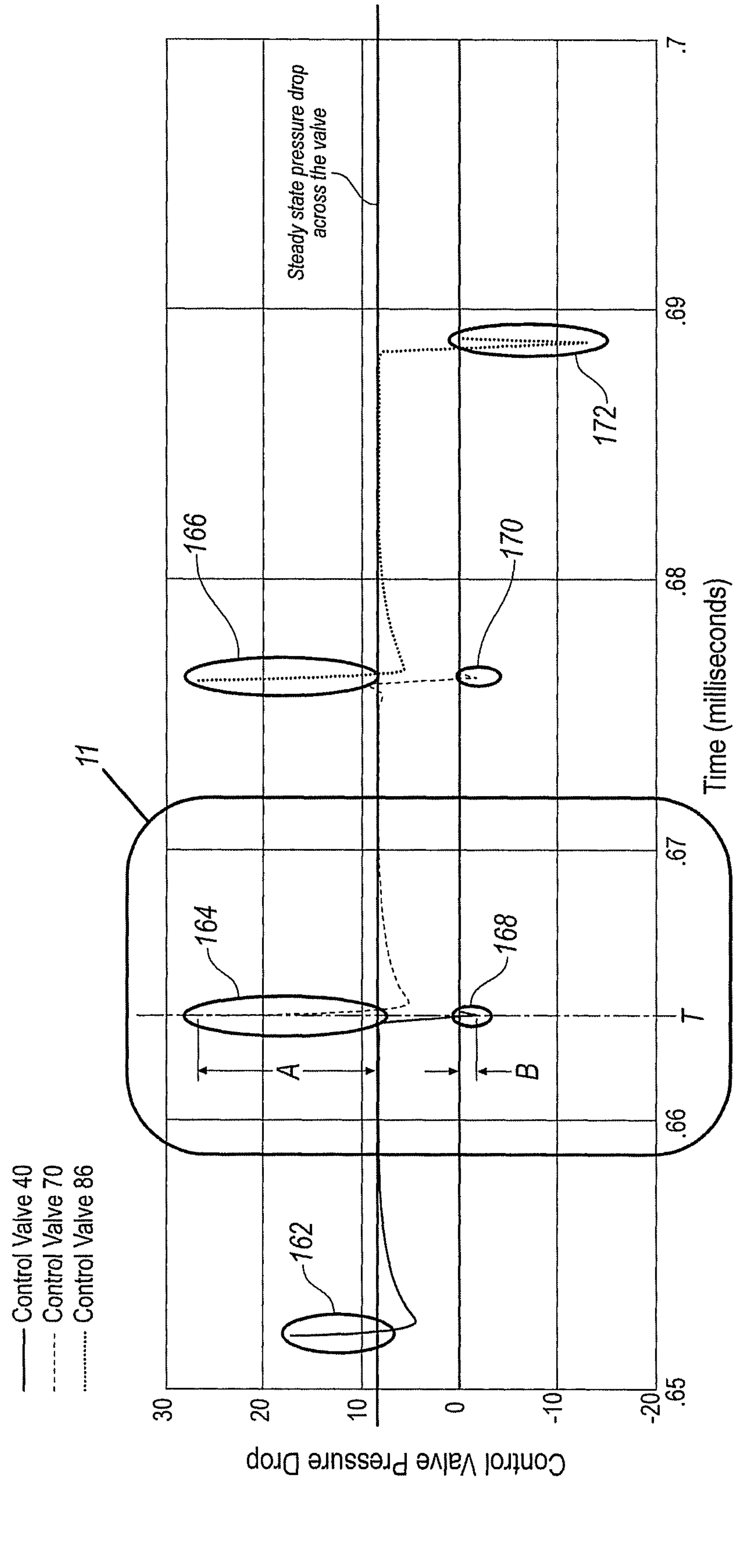
FIG. 9 is a graphical depiction of an exemplary pressure drop occurring across three separate controls valves operated in succession.
Figure 10:
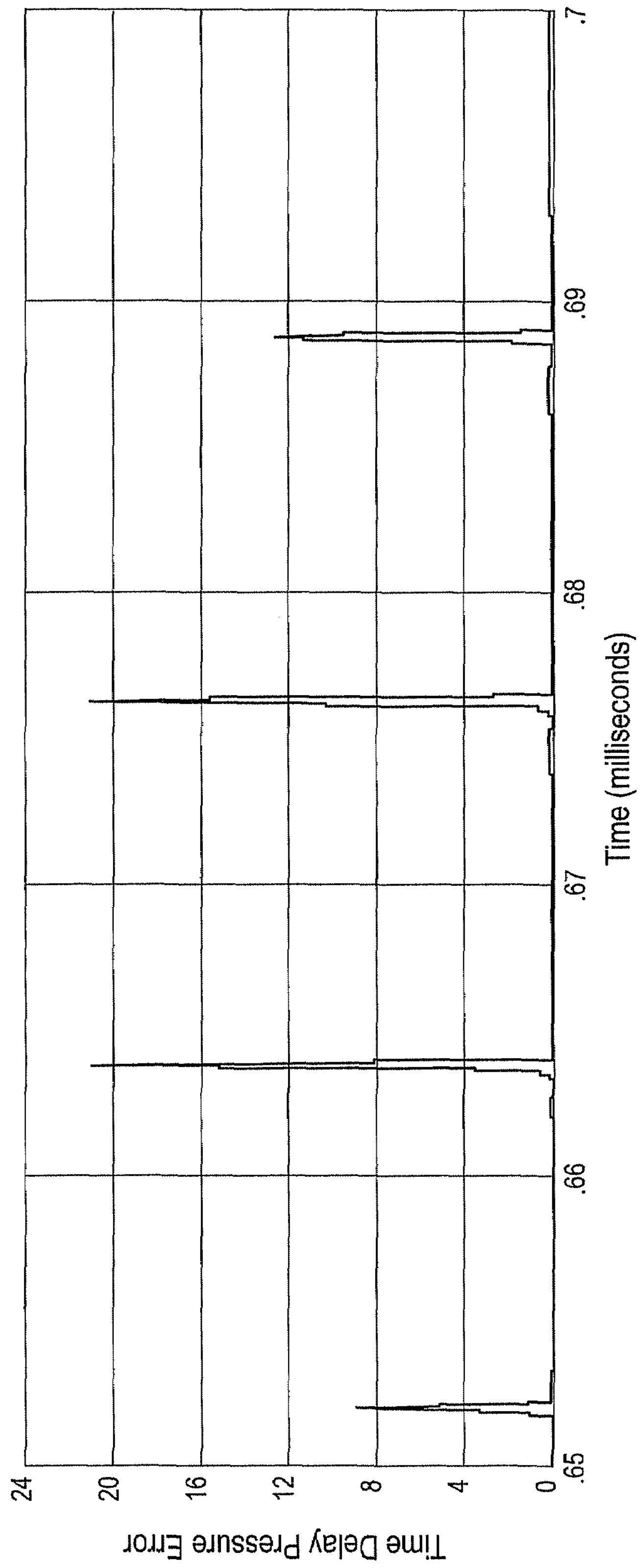
FIG. 10 graphically depicts a Time Delay Pressure Error computed based on the corresponding pressure drops presented in FIG. 9.
Figure 11:
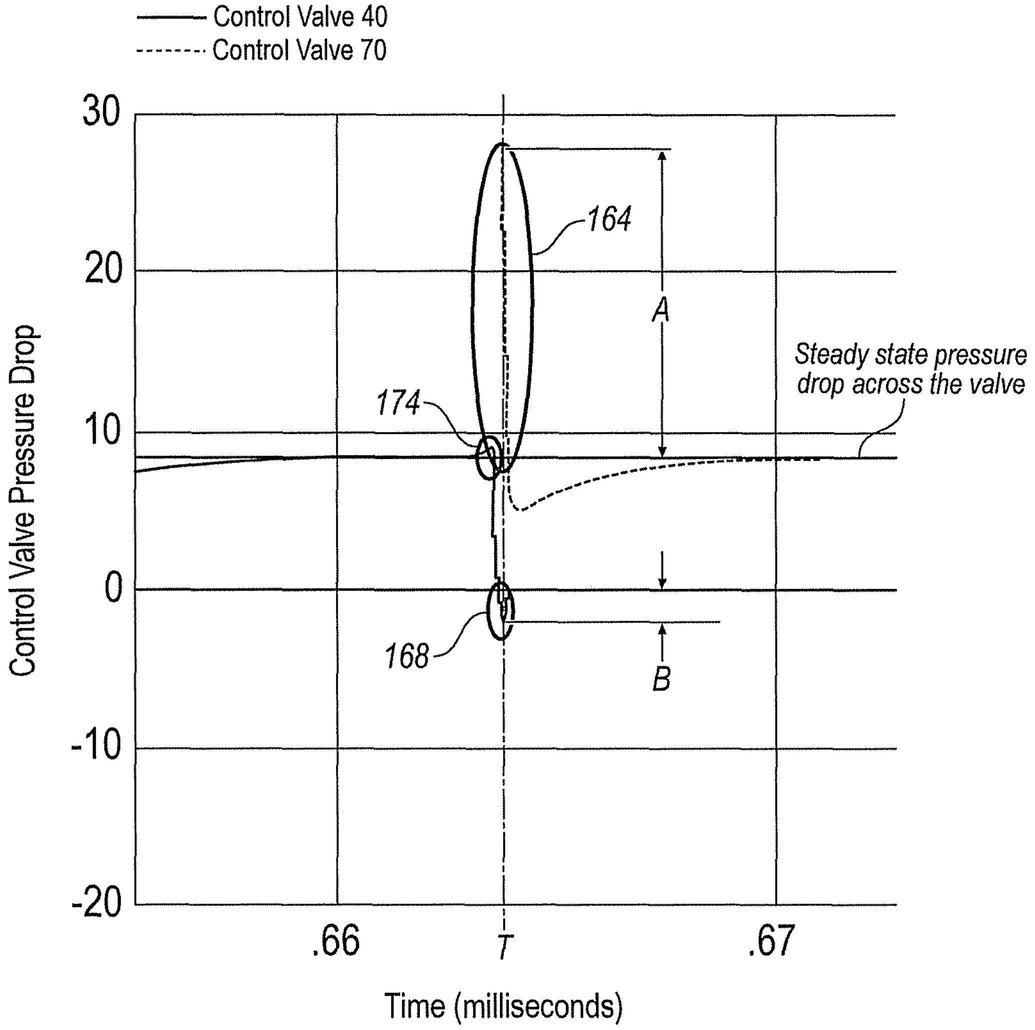
FIG. 11 is an enlarged view of a portion of FIG. 9 depicting the transition period between the closing of one control valve and the opening of the next subsequent control valve.

The substance of the Time Delay Pressure Error may be better understood with reference to FIGS. 9-11. FIG. 9 graphically depicts an exemplary fluctuation in pressure drop occurring across three separate control valves (i.e., control valves 40, 70 and 86) as the valves are successively opened and closed. The three control valves may be actuated in sequence in the manner previously described. In this example, control valve 40 is opened first, followed in order by control valve 70 and control valve 86. The pressure drop across each control valve is tracked starting from the point when the control valve first begins to open through to when the valve is fully closed. The steady state pressure drop across the valves is the same for all three valves and is represented by the horizontal line denoted as such in FIGS. 9 and 11. It shall be appreciated, however, that it is not necessary that each valve have the same pressure drop. Note that the pressure drop curves for successive control valves may at least partially overlap during the transition period during which one valve is closing and the next valve is opening. This is due to the fact that the subsequently actuated valve begins to open before the previous valve is fully closed.

As can be observed from FIG. 9, the pressure drop across a given control valve may vary significantly from the valve's corresponding steady state pressure drop as the valve transitions between its open and closed positions. From the pressure drop curves it may be possible to detect inefficiencies that may be occurring during the transition period. For example, a spike in the pressure drop across a given control valve in excess of the steady state pressure drop that occurs as the valve is opening (i.e., pressure spike 162, 164 and 166 in FIG. 9) may suggest that the time delay (Δt) is too short, causing fluid to backflow from the control valve that is closing to the control valve that is opening. A negative pressure drop across a given control valve that occurs as the control valve is closing (i.e., negative pressure drop 168, 170 and 172) may indicate that fluid is flowing from the control valve that is closing to the passage supplying the fluid to the control valve (e.g., pump discharge passage 22). A spike in the pressure drop across a given control valve in excess of the steady state pressure that occurs as the control valve is closing (i.e., pressure spike 167 in FIG. 11) may indicate that the time delay (Δt) is too long, causing a spike in system pressure.

FIG. 11 is an enlarged view of a portion of FIG. 9, illustrating an exemplary transition period between control valve 70 closing and control valve 86 opening. Note that there is a spike in the pressure drop across control valve 40 above the steady state pressure drop that occurs as the control valve begins to close. This is a due to control valve 40 starting to close before control valve 70 has started to open. The fluid present in the fluid supply circuit between hydraulic pump 12 and control valve 40 is compressed as the control valve closes, thereby causing the spike in system pressure.

Continuing to refer to FIG. 11, the pressure drop across control valve 40 begins to drop below the steady state pressure drop as control valve 70 begins to open, and continues to drop as valve 40 is closed. The pressure drop across control valve 40 eventually goes negative as valve 40 continues to close and valve 70 continues to open. The negative pressure drop may indicate the presence of backflow from control valve 40 to pump discharge 22. The spike in pressure drop across control valve 70 may also signal that fluid is back flowing from control valve 40 to control valve 70. The spike in system pressure and backflow of fluid from control valve 40 to control valve 70 may have a detrimental affect on system efficiency. Minimizing these losses may improve the overall efficiency of the hydraulic system.

With continued reference to FIG. 11, the Time Delay Pressure Error at a given point in time, for example time "T" in FIG. 11, may be computed by summing the amount by which the pressure drop across the control valve exceeds the steady state pressure drop (identified as pressure drop "A" in FIGS. 9 and 11) and the amount by which the pressure drop falls below zero (identified as pressure drop "B" in FIGS. 9 and 11). The first term in the Time Delay Pressure Error (MAX $[(P_{pump}-(P_{load}-\Delta P_{valve}),0)]$) corresponds to pressure drop "A" and the second term (ABS(MIN$[P_{pump}-P_{load},0]$)) corresponds to pressure drop "B". A Time Delay Pressure Error may be computed at various time intervals throughout the operating cycle. A graph of Time Delay Pressure Errors computed using the pressure drops from FIG. 9 is shown in FIG. 10. Note that the Time Delay Pressure Error is zero once the pressure drop across the control valve reaches steady state.

The time delay (Δt) may be optimized by minimizing the Time Delay Pressure Error. This may be accomplished by incrementally varying the TimeDelayAdder parameter in the time delay (Δt) equation until a minimum Time Delay Pressure Error is achieved. A new time delay (Δt) is computed for each TimeDelayAdder value. The corresponding control valve is then operated using the modified time delay (Δt) and the resulting pressure drop across the control valve is tracked. A new Time Delay Pressure Error is computed based on the latest pressure drop data and compared with the previously computed Time Delay Pressure Error. This process continues until a minimum Time Delay Pressure Error is determined. An optimum TimeDelayAdder corresponding to the minimum Time Delay Pressure Error, along with the corresponding pressure and flow rate, may be stored in memory 153 of controller 114 in the form of a lookup table for future reference.

Figure 3:
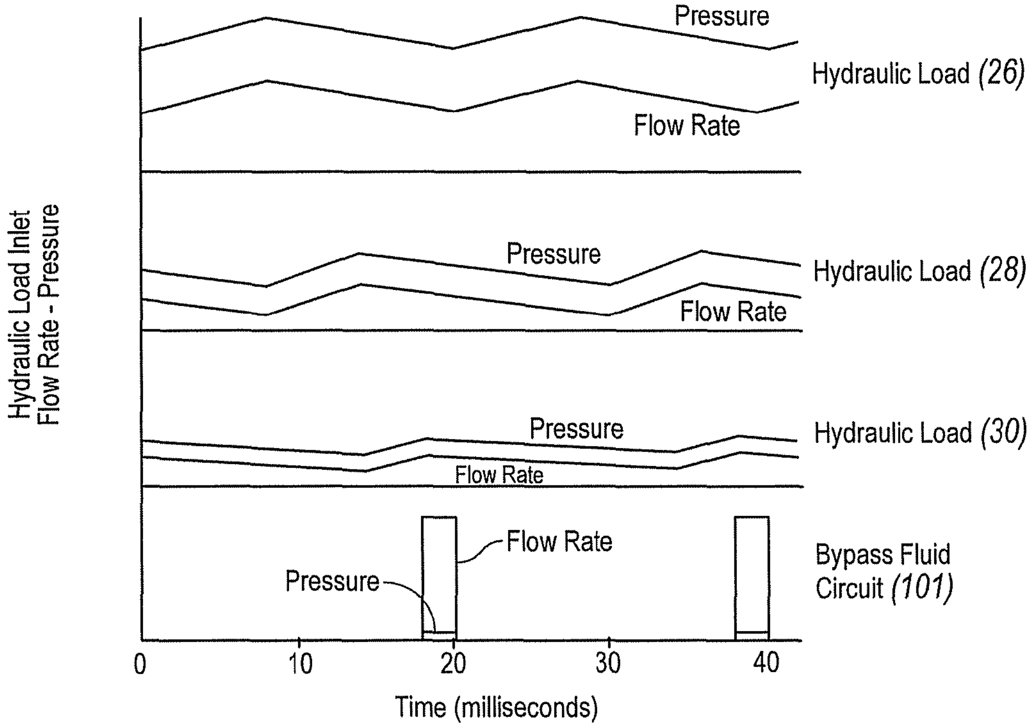
FIG. 3 is a graphical depiction of exemplary relative fluid flow rates and pressure levels that may occur when employing the exemplary valve duty cycles illustrated in FIG. 2.
Figure 4:
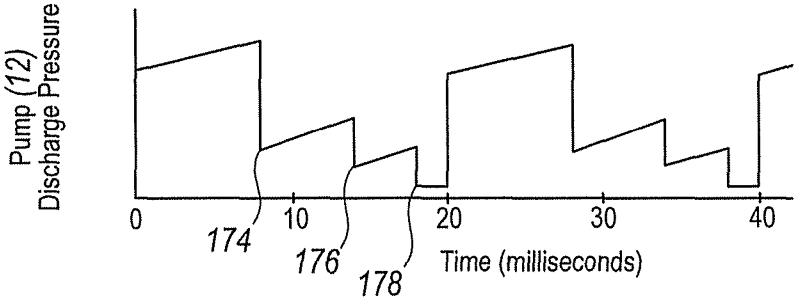
FIG. 4 is a graphical depiction of relative pump output pressure levels that may occur when employing the exemplary valve duty cycles illustrated in FIG. 2.

With reference to FIGS. 1 thru 4, operation of an exemplary operating cycle of hydraulic system 10 will be described. Exemplary duty cycles for control valves 40, 70, 86 and 100 are illustrated in FIG. 2. The time varying fluid output of control valves 40, 70, 86 and 100 is expressed as a percentage of fluid output of pump 12. The exemplary operating cycle commences at time equals zero. For purposes of discussion, it is presumed that hydraulic load 26 initially has the highest pressure requirement, followed in order by hydraulic load 28 and hydraulic load 30. The control valves are actuated in descending order, starting with control valve 40, which controls the hydraulic load having the highest pressure requirement, followed in order by control valves 70, 86, and 100. The exemplary operating cycle has a duration of twenty (20) milliseconds, which corresponds to the operating period of each of the described duty cycles. Two consecutive operating cycles are depicted in FIGS. 2-4, with the second operating cycle commencing at time equals to 20 milliseconds and ending at time equals forty (40) milliseconds. The operating cycles for control valve 40, 70, 86 and 100 all start and end at the same time.

FIG. 4 graphically describes the time varying relative fluctuations in fluid pressure occurring down stream of pump discharge port 24, as detected by pressure sensor 126. The pressure detected by pressure sensor 126 reasonably approximates the pressure occurring at the inlet of the respective loads when the corresponding control valve is open due to the relatively low pressure losses that occur within the hydraulic system.

FIG. 3 graphically describes the time varying relative flow rates and pressure levels occurring near an inlet of the respective hydraulic load. In the case of bypass fluid circuit 101, which does not include a hydraulic load, the pressure and flow rates occur within bypass discharge passage 108. Due to the relatively low pressure losses that occur within the system, the pressure occurring near the inlet of the hydraulic load closely approximates the pressure detected at pump discharge port 24 by pressure sensor 126. Hence, the inlet pressure curve for a given hydraulic load, as shown in FIG. 3, generally corresponds to the pressure occurring at pump discharge port 24 (as shown in FIG. 4) during the period in which the control valve is open.

Continuing to refer to FIGS. 1-4, the exemplary operating cycle may be initiated (at time equals zero in FIGS. 2-4) by controller 114 sending a control signal to actuator 42 instructing the actuator to open control valve 40 and establish a fluid connection between inlet port 46 and discharge port 50. Based on a forty percent (40%) duty cycle, control valve 40 will remain open for a period of approximately eight (8) milliseconds. With control valve 40 in the open position, the entire quantity of fluid discharged from pump 12 will pass through control valve 40 (see FIG. 2) to fluid junction 71. Depending on the flow and pressure requirements of hydraulic load 26, a portion of the fluid arriving at fluid junction 71 will be delivered to hydraulic load 26 through discharge passage 52 and either first supply passage 62 or second supply passage 64 depending on the current flow setting of hydraulic cylinder control valve 54. The time varying rate at which fluid is delivered to hydraulic load 26 is depicted graphically in FIG. 3. The remaining fluid arriving at fluid junction 71 will pass through supply/discharge passage 73 to accumulator 68 to charge the accumulator. As shown in FIG. 4, during the period in which control valve 40 is open, the pressure detected by pressure sensor 126 (which approximates the pressure level occurring near the inlet port of hydraulic load 26, as shown in FIG. 3) will begin to rise as a result of hydraulic load 26 restricting the flow of fluid from pump 12. After control valve 40 has been open for a period of approximately eight (8) milliseconds, controller 114 may send a control signal to actuator 42 instructing the actuator to close control valve 40. With control valve 40 in the closed position, the pressure and flow rate at fluid junction 71 begins to drop. This in turn causes pressurized fluid stored in accumulator 68 to be released into discharge passage 52. As can be observed from FIG. 3, the fluid discharged from accumulator 68 at least partially compensates for the drop in flow and pressure occurring within discharge passage 52 due to control valve 40 being closed. The result is a gradual decrease in the fluid flow and pressure level within discharge passage 52 occurring over a time period of approximately eight (8) milliseconds to approximately twenty (20) milliseconds, rather than an abrupt drop that would likely occur if accumulator 68 were not utilized. The pressure and flow will continue to drop until control valve 40 is opened during a subsequent operating cycle, which occurs at time equaling approximately twenty (20) milliseconds (see FIGS. 2 and 3). The pressure and flow curves will be substantially the same for subsequent operating cycles so long as there is no change in the operating conditions.

Upon closing control valve 40, controller 114 may send a control signal to actuator 77 instructing the actuator to open control valve 70 and establish a fluid connection between inlet port 72 and discharge port 78. Based on a thirty percent (30%) duty cycle, control valve 70 will remain open for a period of approximately six (6) milliseconds, starting at approximately eight (8) milliseconds and ending at approximately fourteen (14) milliseconds. With control valve 70 in the open position, the entire flow of fluid discharged from pump 12 will pass through control valve 70 (see FIG. 2) to fluid junction 85.

As shown in FIG. 4, the pressure within pump discharge passage 22 (as detected by pressure sensor 126) will initially drop to the level indicated at a point 174 of the pressure curve upon opening control valve 70. Depending on the flow and pressure requirements of hydraulic load 28, a portion of the fluid arriving at fluid junction 85 will be delivered to hydraulic load 28 through hydraulic motor supply passage 80. The time varying fluid flow rate near an inlet port of hydraulic load 28 is graphically depicted in FIG. 3. The remaining fluid arriving at fluid junction 85 will pass through supply/discharge passage 87 to accumulator 84 to charge the accumulator. During the period in which control valve 70 is open (time period between approximately eight (8) milliseconds and fourteen (14) milliseconds), the pressure detected by pressure sensor 126 (see FIG. 4) and the pressure level near the inlet port of hydraulic load 28 (see FIG. 3) will begin to rise above the initial pressure that occurred when control valve 70 was first opened (point 174 of FIG. 4). After control valve 70 has been open for a period of approximately six (6) milliseconds, controller 114 can send a control signal to actuator 77 causing control valve 70 to close the fluid path between inlet port 72 and discharge port 78. With control valve 70 closed the pressure level and rate of fluid flow at fluid junction 85 will begin to drop. This will cause pressurized fluid stored in accumulator 84 to discharge into hydraulic motor supply passage 80 during the period in which control valve 70 is closed (time period of 14 milliseconds-28 milliseconds). As can be observed from FIG. 3, the fluid discharged from accumulator 84 at least partially compensates for the drop in flow and pressure that occurs when control valve 70 is closed. The result is a gradual decrease in the flow rate and pressure level within discharge passage 80 that occurs over the time period from approximately fourteen (14) milliseconds to approximately twenty-eight (28) milliseconds. The pressure and flow will continue to drop until control valve 70 is again opened during a subsequent operating cycle, which occurs at time equals approximately twenty-eight (28) milliseconds. The pressure and flow curves will be substantially the same for subsequent operating cycles so long as there is no change in the subsequent operating conditions.

Upon closing control valve 70, controller 114 may send a control signal to actuator 93 instructing the actuator to open control valve 86 to establish a fluid connection between inlet port 88 and discharge port 96. Based on a twenty percent (20%) duty cycle, control valve 86 will remain open for a period of approximately four (4) milliseconds, starting at approximately fourteen (14) milliseconds and ending at approximately eighteen (18) milliseconds. With control valve 86 in the open position, the entire flow of fluid discharged from pump 12 will pass through control valve 86 (see FIG. 2) to fluid junction 97. As shown in FIG. 4, the pressure within pump discharge passage 22 (as detected by pressure sensor 126) will initially drop to the level indicated at point 176 of the pressure curve upon opening control valve 86. Depending on the flow and pressure requirements of hydraulic load 30, a portion of the fluid arriving at fluid junction 97 will be delivered to hydraulic load 30 through hydraulic load supply passage 94. The time varying fluid flow rate near an inlet port of hydraulic load 30 is graphically depicted in FIG. 3. The remaining fluid arriving at fluid junction 97 will pass through supply/discharge passage 99 to accumulator 95 to charge the accumulator. During the period in which control valve 86 is open (time period of approximately fourteen (14) milliseconds to approximately eighteen (18) milliseconds), the pressure detected by pressure sensor 126 (see FIG. 4) and the pressure occurring near the inlet port of hydraulic load 30 (see FIG. 3) will begin to rise above the initial pressure that occurred when control valve 86 was first opened (point 176 of FIG. 4). After control valve 86 has been opened for a period of approximately four (4) milliseconds, controller 114 may send a control signal to actuator 93 causing control valve 86 to close the fluid path between inlet port 88 and discharge port 96. With control valve 86 in the closed position, the pressure level and rate of fluid flow at fluid junction 97 will begin to drop. This will cause pressurized fluid stored in accumulator 95 to be discharged into hydraulic load supply passage 94 during the period in which control valve 86 is closed (time period approximately eighteen (18) milliseconds to approximately thirty-four (34) milliseconds). As can be observed from FIG. 3, the fluid discharged from accumulator 95 at least partially compensates for the drop in flow and pressure that occurs when control valve 86 is closed. The result is a gradual decrease in the flow rate and pressure level within discharge passage 94 that occurs over the time period between 18 milliseconds and 34 milliseconds. The pressure and flow will continue to drop until control valve 86 is again opened during a subsequent operating cycle (at time equals approximately thirty-four (34) milliseconds). The pressure and flow curves will be substantially the same for subsequent operating cycles so long as there is no change in the subsequent operating conditions.

Upon closing control valve 86, control valve 100 may be selectively opened to dump any excess pressure present within pump discharge passage 22 to fluid reservoir 18. Controller 114 may send a control signal to actuator 112 instructing the actuator to open bypass control valve 100 to establish a fluid connection between inlet port 102 and discharge port 110. Based on a ten percent (10%) duty cycle, control valve 86 will remain open for a period of two (2) milliseconds, starting at eighteen (18) milliseconds and ending at twenty (20) milliseconds. The closing of control valve 86 at approximately twenty (20) milliseconds corresponds to the end of the current operating cycle and the beginning of the subsequent operating cycle. With control valve 100 in the open position, the entire flow of fluid discharged from pump 12 will pass through control valve 100 (see FIG. 2) and bypass discharge passage 108 to reservoir return passage 66. As shown in FIG. 4, the pressure within pump discharge passage 22 (as detected by pressure sensor 126) will drop to the level indicated at point 178 of the pressure curve when control valve 100 is opened, and will remain at that pressure until control valve 100 is closed at time equals approximately twenty (20) milliseconds. After bypass control valve 100 has been open for a period of two (2) milliseconds, controller 114 may send a control signal to actuator 112 causing control valve 100 to close the fluid path between inlet port 102 and discharge port 110.

The current exemplary operating sequence is completed when bypass control valve 100 is closed. A subsequent operating sequence may be commenced by actuating control valve 40 and repeating the previously described operating sequence. If there a change in operating conditions, for example, wherein a pressure requirement of a hydraulic load has increased or decreased, the affected control valve duty cycle may be reevaluated and adjusted as necessary to accommodate the changed operating condition.

With regard to the processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

It is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A method comprising:

selecting a target value for a hydraulic system operating parameter;

formulating a pulse width modulated control signal based on the target value;

transmitting the control signal to a valve operable to selectively fluidly connect a hydraulic load to a pressure source; and operating the control valve in response to the control signal;

wherein the control signal is configured to control at least one of a flow rate based on feedback information received from a flow sensor and a pressure based on pressure data received from a pressure sensor, with the pressure set lower than a predetermined maximum pressure applied to the hydraulic load and at least equal to a minimum pressure delivered to the hydraulic load.

2. The method claim 1 further comprising:

determining a hydraulic system operating parameter; and formulating the control signal based on the target value and the determined system operating parameter.

3. The method of claim 2, wherein the determining of the operating parameter includes employing a sensor to detect the operating parameter and transmitting a signal from the sensor indicative of the determined system operating parameter.

4. The method of claim 3 further comprising:

monitoring detected changes in the determined system operating parameter; and adjusting the control signal in response to the detected changes in the determined system operating parameter.

5. The method of claim 2 further comprising:

determining an operating parameter error based on the target value and the determined system operating parameter;

determining if the determined system operating parameter error falls within a selected error range; and modifying the control signal if the determined system operating parameter error falls outside the selected error range.

6. The method of claim 1, wherein the control signal defines a valve duty cycle specifying a time period over which the valve is cycled between an open position and a closed position.

7. The method of claim 1, wherein the step of formulating the control signal includes determining a duty cycle defining time periods in which the valve is arranged in an open position and a closed position.

8. The method of claim 1, wherein the valve cycles between a closed position and an open position in response to the control signal.

9. The method of claim 1, wherein the control signal defines an operating frequency of the valve.

10. A hydraulic system comprising:

a digital valve operable to fluidly connect a hydraulic load to a pressure supply; and a digital controller operably connected to the digital valve, the digital controller storing a target value of a hydraulic system operating parameter, the digital controller configured to formulate a pulse width modulated control signal based on the target value, the digital controller transmitting the control signal to the digital valve for controlling the operation of the valve, wherein the control signal is configured to control at least one of a flow rate based on feedback information received from a flow sensor and a pressure based on pressure data received from a pressure sensor, with the pressure set lower than a predetermined maximum pressure applied to the hydraulic load and at least equal to a minimum pressure delivered to the hydraulic load.

11. The hydraulic system of claim 10, wherein the controller is configured for determining a hydraulic system operating parameter and formulating the control signal based on the target value and the determined system operating parameter.

12. The hydraulic system of claim 11 further comprising a sensor operably connected the controller, the sensor configured to detect the operating parameter and transmit a signal to the controller indicative of the determined system operating parameter.

13. The hydraulic system of claim 12 wherein the sensor monitors the system operating parameter and the controller is configured to adjust the control signal in response to detected changes in the determined system operating parameter.

14. The hydraulic system of claim 11, wherein the controller is configured to determine an operating parameter error based on the target value and the determined system operating parameter; determine if the determined system operating parameter error falls within a selected error range; and modify the control signal if the determined system operating parameter error falls outside the selected error range.

15. The hydraulic system of claim 10, wherein the control signal defines a valve duty cycle specifying a time period over which the valve is cycled between an open position and a closed position.

16. The hydraulic system of claim 10, wherein the controller is configured to determine a duty cycle defining time periods in which the digital valve is arranged in an open position and a closed position.

17. The hydraulic system of claim 10, wherein the digital valve cycles between a closed position and an open position in response to the control signal.

18. The hydraulic system of claim 10, wherein the control signal defines an operating frequency of the digital valve.

* * * * *